United States Patent
Kuhlmann et al.

[11] Patent Number: 5,844,174
[45] Date of Patent: Dec. 1, 1998

[54] ELECTRONIC BALANCE WITH GUIDE-ROD PARALLEL GUIDE AND WIRE STRAIN GAUGE CORNER LOAD SENSOR

[75] Inventors: Otto Kuhlmann; Christoph Berg, both of Göttingen, Germany

[73] Assignee: Sartorius AG, Göttingen, Germany

[21] Appl. No.: 911,272

[22] Filed: Aug. 14, 1997

[30] Foreign Application Priority Data

Aug. 14, 1996 [DE] Germany .................. 196 32 709.1

[51] Int. Cl.[6] ............................. G01G 19/52; G01G 3/14; G01C 17/38
[52] U.S. Cl. ..................... 177/50; 177/210 EM; 73/1.13; 73/1.15
[58] Field of Search ..................... 73/1.13, 1.15; 177/50, 210 R, 210 EM

[56] References Cited

U.S. PATENT DOCUMENTS

| | | | |
|---|---|---|---|
| 4,128,001 | 12/1978 | Marks | 73/1.13 |
| 4,261,195 | 4/1981 | Lockery | 73/1.15 |
| 4,331,035 | 5/1982 | Eisele et al. | 73/1.13 |
| 4,342,217 | 8/1982 | Paetow | 73/1.13 |
| 4,380,175 | 4/1983 | Griffen | 73/1.13 |
| 4,556,115 | 12/1985 | Lockery et al. | 177/50 |
| 4,657,097 | 4/1987 | Griffen | 73/1.13 |
| 4,848,477 | 7/1989 | Oldendorf et al. | 177/50 |
| 4,869,113 | 9/1989 | Sarrazin | 73/1.13 |
| 4,892,163 | 1/1990 | Aumard | 73/1.13 |
| 4,909,338 | 3/1990 | Vitunic et al. | 177/50 |
| 4,958,526 | 9/1990 | Haggstrom | 73/1.13 |
| 4,979,580 | 12/1990 | Lockery | 73/1.13 |

*Primary Examiner*—Randy W. Gibson
*Attorney, Agent, or Firm*—Eric P. Schellin

[57] ABSTRACT

An electronic balance with a balance scale (3) which is movably connected by a parallel guide consisting of an upper (4) and a lower guide rod (5) in a vertical direction to a system carrier (1) fixed to the housing, with at least two wire strain gauges (15) which are arranged in the vicinity of the ends of a guide rod (4), which ends are on the housing side, and which wire strain gauges measure the horizontal forces in the guide rod (4) which are caused by the torque transferred from the balance scale (3) onto the parallel guide, and with electronics which corrects the weight value emitted from the weighing receiver on the basis of the output signals of the wire strain gauges (15) and from stored comer-load correction factors that at least one of the guide rods (4) is supported on its housing-side end on an intermediate piece (18), that this intermediate piece (18) is connected by at least one approximately vertical thin web (13) and by a horizontal thin web (14) to the system carrier (1) fixed to the housing and that at least one wire strain gauge (15) is fastened to the horizontal thin web (14). This makes it possible to obtain a high output signal from the wire strain gauge in the case of a corner load without the stability of the parallel guide being adversely affected.

7 Claims, 3 Drawing Sheets

ELECTRONIC BALANCE WITH GUIDE-ROD PARALLEL GUIDE AND WIRE STRAIN GAUGE CORNER LOAD SENSOR

BACKGROUND OF THE INVENTION

The invention is relative to an electronic balance with a balance scale which is movably connected by a parallel guide consisting of an upper and a lower guide rod in a vertical direction to a system carrier fixed to the housing, with at least two wire strain gauges which are arranged in the vicinity of the ends of a guide rod, which ends are on the housing side, and which wire strain gauges measure the horizontal forces in the guide rod which are caused by the torque transferred from the balance scale onto the parallel guide, and with electronics which corrects the weight value emitted from the weighing receiver on the basis of the output signals of the wire strain gauges and from stored comer-load correction factors. Such a balance is known from DE 195 02 694 C1. The wire strain gauges are attached to the thin areas of the guide rods. A comer-load compensation takes place with the aid of a metal plate which is fastened below the load receiver and instantaneously tilts upon a comer load.

In another known balance of this type, DE 30 03 862 C2, the wire strain gauge comer-load sensors are arranged on the upper guide rod in the vicinity of the guide-rod moving joints on the housing side. If the guide rods are to be relatively stable, their cross section outside of the moving joints is, however, relatively large then, so that the specific material loading and therewith the signal of the wire strain gauge comer-load sensors are relatively low.

EP 826 017 A1 teaches a force-measuring element for a balance which consists of a parallel guide consisting of an upper and a lower guide rod. Flexing beams are created by recesses through expressly reduced and equal material cross sections to which beams wire strain gauges are attached for deriving the measuring signal.

The invention therefore has the problem of designing a balance of the initially mentioned type in such a manner that an area with high material loading is produced at which an adhered wire strain gauge produces a large signal without the totality of the stability of the guide rod or of the parallel guide being adversely affected.

SUMMARY OF THE INVENTION

According to the invention at least one of the guide rods is supported on its end on the housing side on an intermediate piece, which intermediate piece is connected by at least one approximately vertical thin web and by a horizontal thin web to the system carrier fixed to the housing, and at least one wire strain gauge is fastened to the horizontal thin web.

The intermediate piece is therefore connected in a rotationally movable manner by the vertical thin web to the system carrier fixed to the housing and transfers almost 100% of the horizontal forces of the guide rod onto the horizontal thin web. This horizontal thin web can be dimensioned in such a manner in accordance with the maximum horizontal force transferred from the guide rod that a high specific material loading and accordingly a high signal of the adhered-on wire strain gauge results. The binding of the intermediate piece by a horizontal and by a vertical web achieves a good stability even if the webs are designed to be relatively thin.

BRIEF DESCRIPTION OF THE DRAWINGS

The invention is described in the following with reference made to the schematic figures.

DETAILED DESCRIPTION OF THE DRAWINGS

Figure 1:
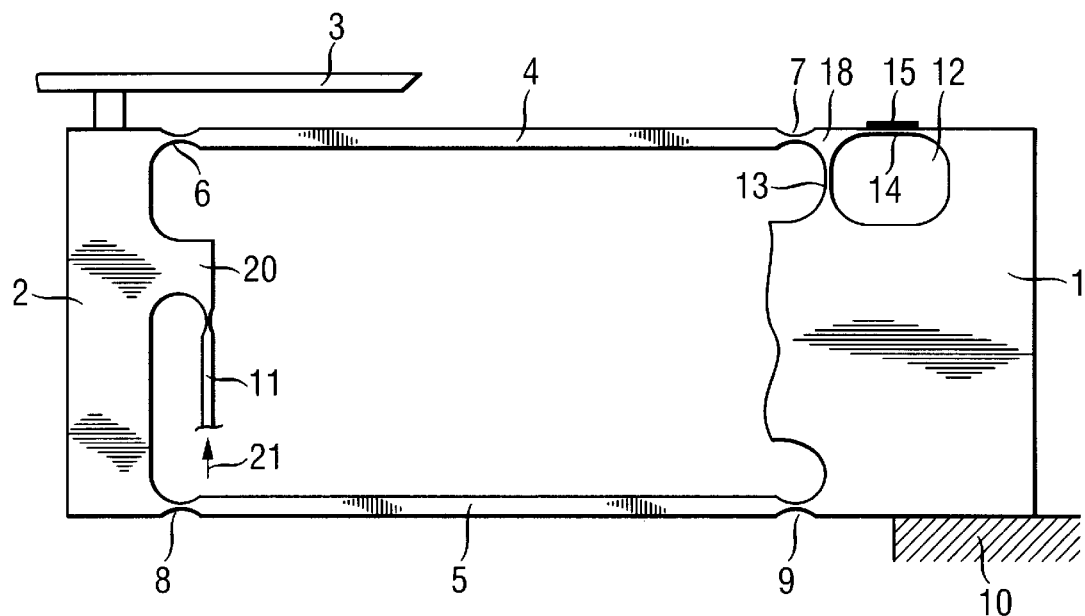
FIG. 1 shows a lateral view of the essential parts of the weighing system.

The lateral view of FIG. 1 shows a balance-scale carrier 2 connected via a parallel guide consisting of upper guide rod 4 and lower guide rod 5 in a vertically movable manner to system carrier I which are fixed to the housing. The flexible joints of upper guide rod 4 are designated by 6 and 7 and the flexible joints of lower guide rod 5 by 8 and 9. Balance-scale carrier 2 carries balance scale 3, which is only suggested. The support of system carrier 1, which is fixed to the housing, is likewise only indicated by base 10. The force exerted by the load to be weighed on balance scale 3 is transferred from projection 20 of balance-scale carrier 2 via coupling element 11 onto the actual force measuring system of the balance, which is not shown and only symbolized by arrow 21. For example, two translation levers can attack coupling element 11 like those described in DE-OS 195 40 782 and the force measuring system can operate in accordance with the known principle of the electromagnetic compensation of force. The parts of the weighing system described above are generally known and are therefore described only quite briefly.

Upper guide rod 4 is supported behind its flexible joint 7 on an intenmediate piece 18 which is rotatably mounted on system carrier 1 by vertical thin web 13. In addition, intermediate piece 18 is connected to system carrier 1 by a horizontal thin web 14 carrying wire strain gauge 15. Horizontal forces produced upon off-center position of the material to be weighed on balance scale 3 in guide rod 4 therefore result in a proportional expansion or shortening of horizontal thin web 14 and therewith to a change of resistance of adhered-on wire strain gauge 15, which change can be measured in a known manner. Since web 13 is thin the horizontal forces from guide rod 4 are transferred almost completely onto horizontal web 14. Nevertheless, thin web 13 assures the necessary stability of guide rod 4 and of the parallel guide as a whole and prevents in particular a bending out of intermediate piece 18 under forces of pressure.

Figure 2:
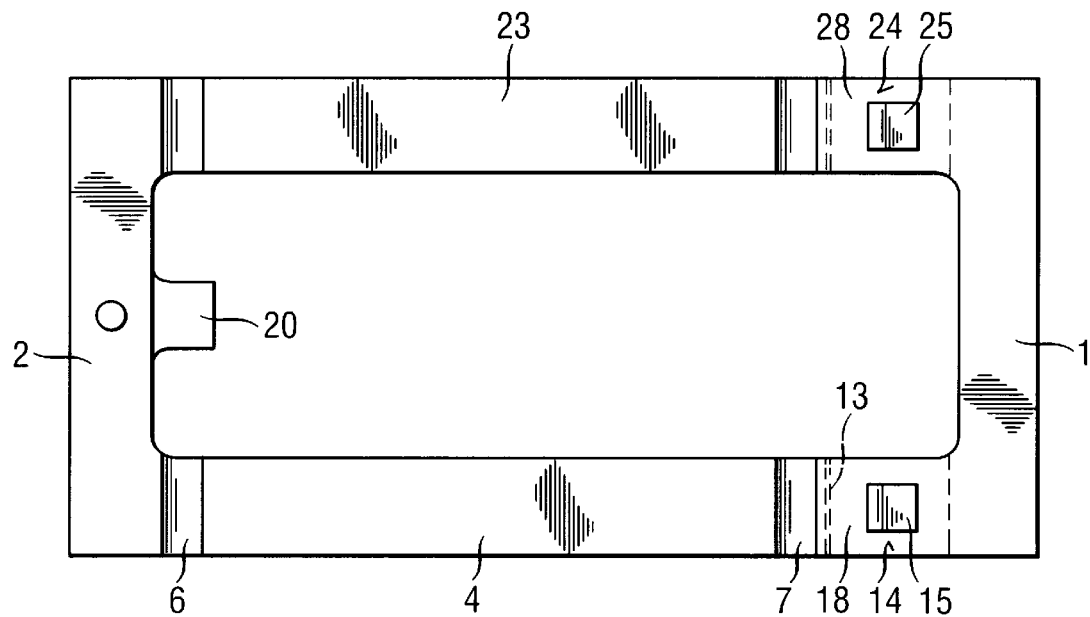
FIG. 2 shows a top view onto the weighing system of FIG. 1.

As is seen from the top view in FIG. 2, upper guide rod 4 is divided in general into two partial guide rods 4 and 23. Partial guide rod 23 is likewise supported on an intermediate piece 28 which is connected to system carrier 1 via a vertical web (not shown) and horizontal web 24. Wire strain gauge 25 is adhered to horizontal web 24. The second wire strain gauge makes it possible in a known manner to determine the off-center position of the material to be weighed on the balance scale in the direction of left/right in the view of FIG. 1 from the composite signal of the two wire strain gauges and the off-center position in the direction of in front of behind the drawing plane in the view of FIG. 1 from the differential signal of the two wire strain gauges. The evaluating electronics necessary for this is also known and described in DE patent 30 03 862 already cited.

Figure 3:
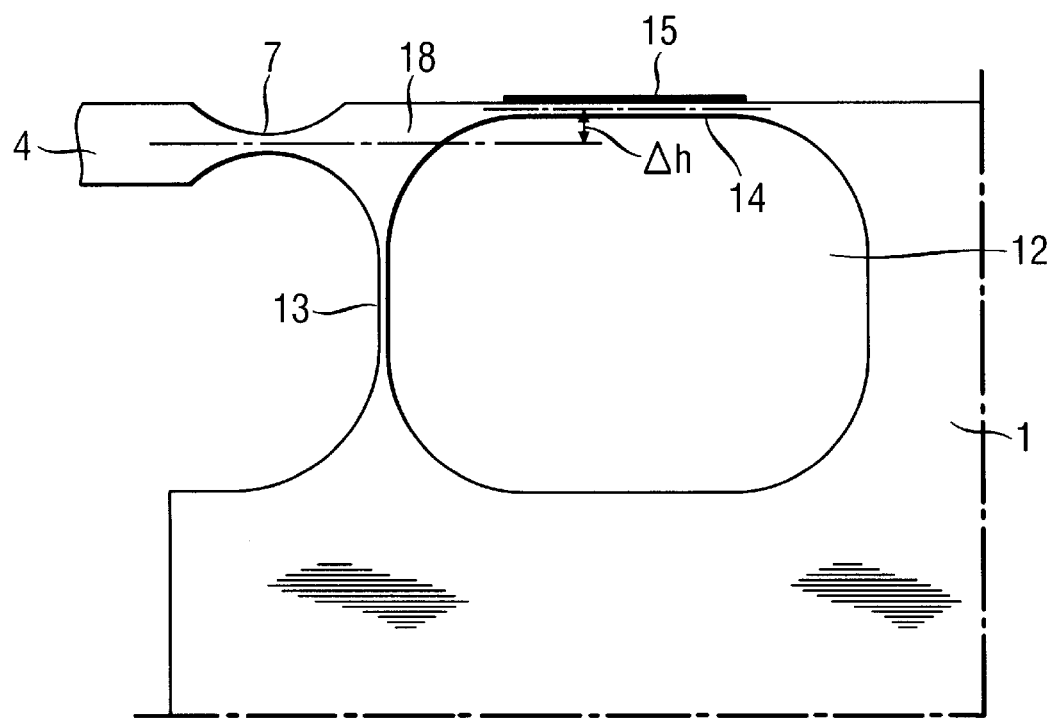
FIG. 3 shows an enlarged fragmentary detail from FIG. 1.

A horizontal pressure force in guide rod 4 results in a shortening of web 14 and, as a result, normally in a slight arcuate rotation of intermediate piece 18 clockwise in FIG. 1 about thin area 13 as rotary articulation. As a result thereof, flexible joint 7 of guide rod 4 is angularly raised somewhat. This effect is very small but can nevertheless lead to a noticeable non-linear comer-load behavior in balances with very high resolution. This effect can be prevented by several measures:

In a first advantageous embodiment, as is to be explained using the enlarged detailed drawing of FIG. 3, an offset in height Δh is provided between guide-rod flexible joint 7 and horizontal web 14. This offset in height Δh results upon a horizontal pressure force in guide rod 4 in a torque which would rotate intermediate piece 18 counterclockwise if vertical web 13 were missing. Given the correct size of this torque in a counterclockwise direction the above-indicated effect of the rotating of intermediate piece 18 in a clockwise direction is compensated. Given the correct selection of offset in height Δh suitable for the length and the rigidity of vertical web 13, intermediate piece 18 will thus not execute any rotary movement but rather only shift laterally with web 13 deforming in an S-shape.

Figure 4:
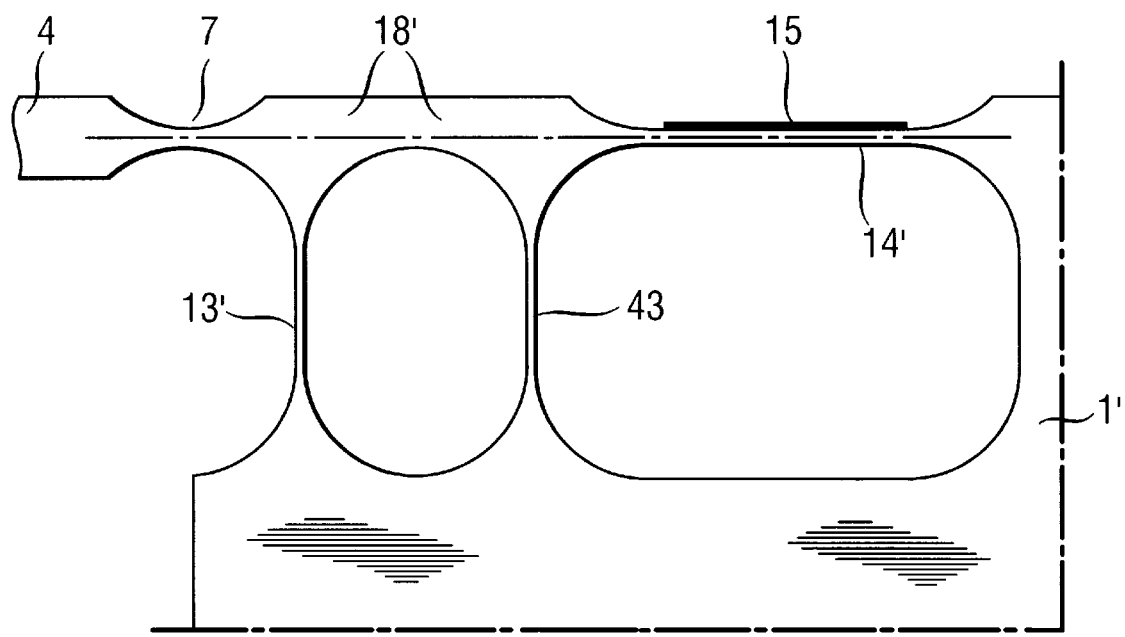
FIG. 4 shows an enlarged fragmentary detail of the weighing system in a second embodiment.

In a second advantageous embodiment like that shown in FIG. 4 the rotary movement of intermediate piece 18' is prevented by a second vertical web 43 which forms together with web 13' a parallel guide for intermediate piece 18'.

Figure 5:
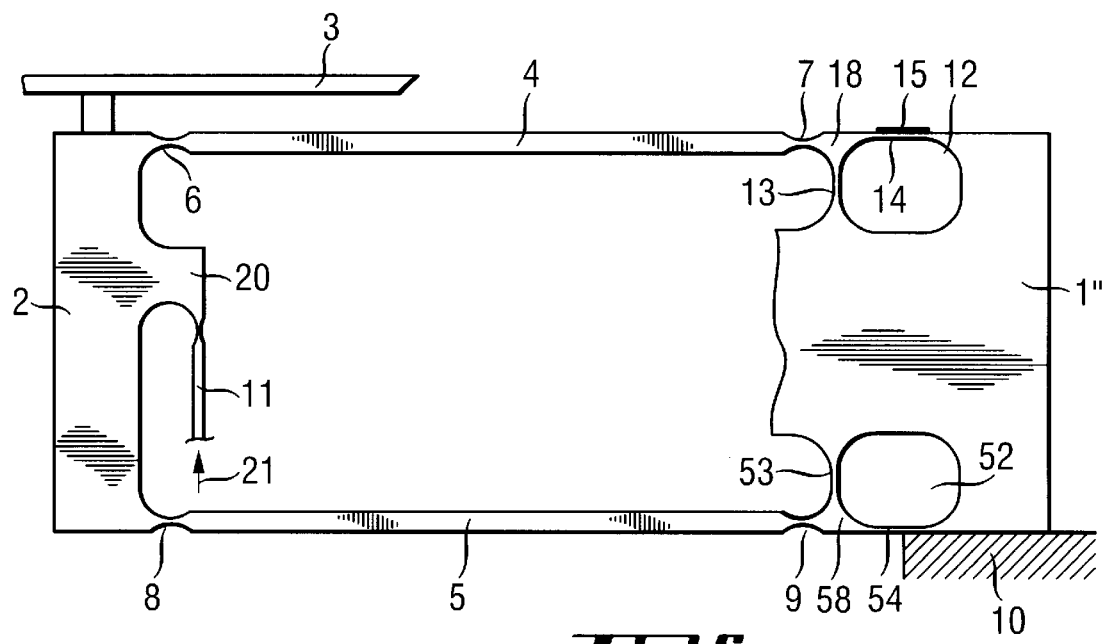
FIG. 5 shows a lateral view of the essential parts of the weighing system in a third embodiment.

In a third advantageous embodiment like that shown in FIG. 5 in system carrier 1" not only recess 12 is located on the support point of upper guide rod 4 but also a recess 52 is located on the support point of lower guide rod 5. This creates an intermediate piece 58 on lower guide rod 5 too which intermediate piece is connected to system carrier 1" via vertical thin web 53 and horizontal web 54. If there is an off-center loading of balance scale 3, e.g. on the right (in FIG. 5) side, a pressure force on intermediate piece 18 is produced in upper guide rod 4 which raises flexible joint 7 somewhat. (It is assumed thereby that offset in height Δh is zero according to FIG. 3 or smaller than the one necessary for self-compensation.) At the same time, a traction on intermediate piece 58 is produced in lower guide rod 5 which traction likewise raises flexible joint 9 somewhat. If webs 53 and 13 are equally long and equally rigid and webs 54 and 14 likewise, then the change in height at flexible joint 9 is equal to the change in height on flexible joint 7 so that the influence on the parallelism of the parallel guide is canceled out.

Figure 6:
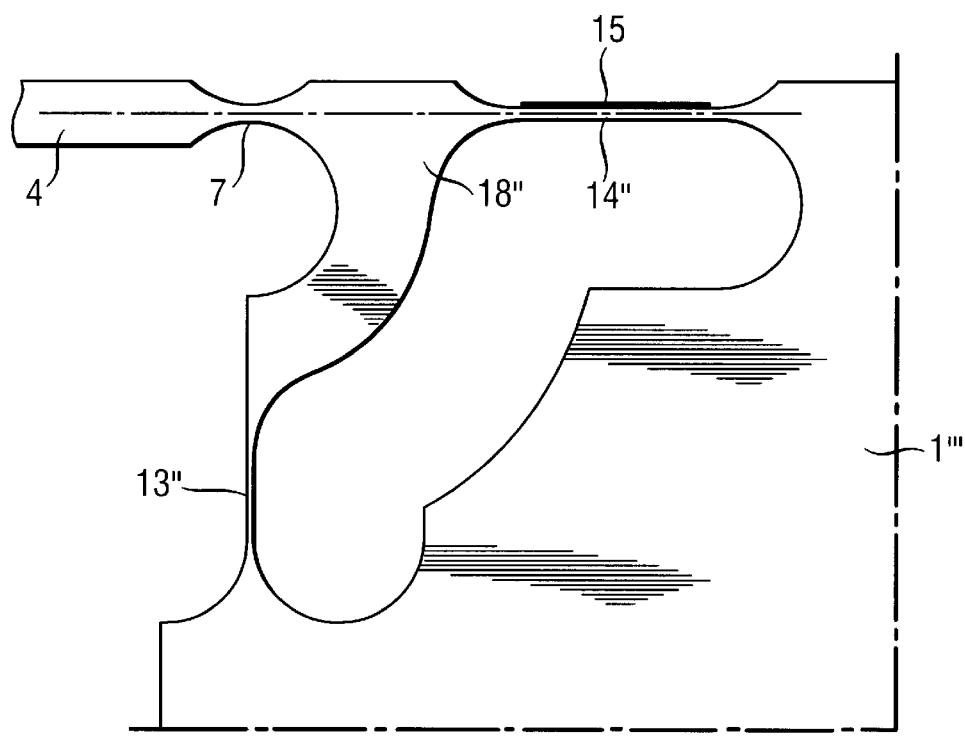
FIG. 6 shows an enlarged fragmentary detail of the weighing system in a fourth embodiment.

A fourth advantageous embodiment is shown in FIG. 6 on an enlarged scale. In this embodiment flexible joints 7 of guide rod 4 are located vertically over vertical thin web 13". As a result thereof, a rotation of intermediate piece 18" under the action of force does not result in a change in height of flexible joint 7 so that the parallelism of the parallel guide is likewise not influenced.

It is also possible to make a firm rough compensation by one of the described measures and to eliminate the remaining non-linearity by an electrical fine compensation tailored to the individual balance. It is of course also possible to combine several of the described methods with each other. The described corrective measures can be used not only for balances with wire strain gauge comer load sensor and electronic corner load correction but they can also positively influence the non-linearity of the corner-load behavior in balances without comer load sensor.

The drawings always show a so-called monolithic weighing system in which system carrier 1, balance-scale carrier 2 and guide rods 4,5 are manufactured from a single metal block (e.g. by milling). However, the support of at least one guide rod on an intermediate piece in accordance with the invention is also possible for weighing systems composed of individual components.

We claim:

1. An electronic balance with a balance scale (3) with a weight sensor for measuring vertical forces which is movably connected by a parallel guide consisting of an upper (4, 23) and a lower guide rod (5) in a vertical direction to a system carrier (1; 1'; 1"; 1''') fixed to the housing, with at least two wire strain gauges (15, 25) which are arranged in the vicinity of the ends of a guide rod (4, 23), which ends are on the housing side, and which wire strain gauges measure the horizontal forces in the guide rod (4, 23) which are caused by the torque trsnsferred from the balance scale (3) onto the parallel guide, and with electronics which corrects the weight value emitted from the weight sensor on the basis of the output signals of the wire strain gauges (15, 25) and from stored comer-load correction factors, characterized in that at least one of the guide rods (4, 23) is supported on its housing-side end on an intermediate piece (28, 18; 18'; 18"), that this intermediate piece (28, 18; 18'; 18") is connected by at least one approximately vertical thin web(13; 13'; 13")and by a horizontal thin web(24; 14; 14'; 14")to the system carrier (1; 1'; 1"; 1''') fixed to the housing and that at least one wire strain gauge (15, 25) is fastened to the horizontal thin web (24; 14; 14'; 14").

2. The electronic balance according to claim 1, wherein the horizontal thin web (14'; 14") is located at the same level as the guide-rod joint (7).

3. The electronic balance according to claim 1, wherein the horizontal thin web (14) displays a slight offset in height (Δh) relative to the guide-rod flexible joint (7).

4. The electronic balance according to claims 1 or 2, wherein the intermediate piece (18') is connected by two approximately vertical thin webs (13', 43) and a horizontal thin web 14') to the system carrier (1') fixed to the housing.

5. The electronic balance according to claims 1 or 2, wherein both the upper guide rod (4) and the lower guide rod (5) are each supported on intermediate pieces (18, 58) and that these intermediate pieces (18, 58) are connected by at least one approximately vertical thin web (13, 53) and by a horizontal thin web (14, 54) to the system carrier (1") fixed to the housing.

6. The electronic balance according to claims 1 or 2, wherein the prolongation of the vertical thin web (13") is located in the prolongation of the thinnest position of the guide-rod flexible joint (7) of the guide rod (4).

7. The electronic balance according to one of claims 1 or 2, wherein at least one of the guide rods (4) is split up into two partial guide rods (4, 23), that both partial guide rods (4, 23) are supported on their housing-side end on an intermediate piece (18, 28), that each intermediate piece (18, 28) is connected by at least one approximately vertical thin web (13) and by a horizontal thin web (14, 24) to the system carrier (1) fixed to the housing and that a wire strain gauge (15, 25) is fastened to each of the two horizontal webs (14, 24).

* * * * *